United States Patent

Ohta et al.

[11] Patent Number: 5,162,163
[45] Date of Patent: Nov. 10, 1992

[54] MAGNETIC RECORDING MEDIUM HAVING A LUBRICANT FILM CONSISTING OF A MIXTURE OF TWO LUBRICANTS AND WHICH HAS TWO PEAKS OF MOLECULAR WEIGHT

[75] Inventors: Sakae Ohta, Odawara; Hiroyuki Matsumoto, Ebina; Miyuki Kajiki, Odawara; Makoto Komatsu, Odawara; Kenzo Masuda, Odawara; Fumio Nakano, Odawara, all of Japan

[73] Assignee: Hitachi Ltd., Tokyo, Japan

[21] Appl. No.: 580,463

[22] Filed: Sep. 11, 1990

[30] Foreign Application Priority Data

Sep. 20, 1989 [JP] Japan .................................. 1-241961

[51] Int. Cl.⁵ ................................................. G11B 5/00
[52] U.S. Cl. ...................................... 428/695; 428/694; 428/900; 428/172
[58] Field of Search ................ 428/694, 695, 900, 172

[56] References Cited

U.S. PATENT DOCUMENTS

| | | | |
|---|---|---|---|
| 4,642,246 | 2/1987 | Janssen et al. | 427/127 |
| 4,647,507 | 3/1987 | Suzuki et al. | 428/421 |
| 4,786,544 | 11/1988 | Saito | 428/143 |
| 4,794,035 | 12/1988 | Ishihara et al. | 428/219 |

FOREIGN PATENT DOCUMENTS 62-114122  5/1987  Japan.

Primary Examiner—Paul J. Thibodeau
Assistant Examiner—Stevan A. Resan
Attorney, Agent, or Firm—Antonelli, Terry, Stout & Kraus

[57] ABSTRACT

This invention relates to a magnetic recording medium wherein the improvement comprises a lubricative film comprising a lubricant having a functional group at one end of the molecule and a lubricant having a functional group at both ends of the molecule. According to the present invention, there are provided a magnetic recording medium having excellent sliding tolerance against the head, reduced adhesiveness and dense surface, and a magnetic storage device using such a recording medium.

5 Claims, 2 Drawing Sheets

MAGNETIC RECORDING MEDIUM HAVING A LUBRICANT FILM CONSISTING OF A MIXTURE OF TWO LUBRICANTS AND WHICH HAS TWO PEAKS OF MOLECULAR WEIGHT

BACKGROUND OF THE INVENTION

1. Field of the Invention

This invention relates to a magnetic recording medium and a magnetic storage device using it. The invention particularly relates to the surface structure of the magnetic recording medium.

2. Description of the Prior Art

Forming a lubricative thin film on the surface of a magnetic disc (which may hereinafter be referred to simply as disc) is a technique which has been widely used for the purpose of preventing damage to the disc by frictional contact with a magnetic head. However, in the case of a disc made using a sputtering technique, as it has a very smooth surface, thick coating thereof with a lubricant tends to cause adhesion of the disc to the head. Such adhesion gives rise to a large load at the time of restarting to cause operational failure of the storage or damage to the head and disc.

In order to solve these problems, techniques for strongly bonding a lubricant on the magnetic disc surface have been studied, and several proposals have been made concerning such techniques. For example, Japanese Patent Application Kokai No. 62-114122 discloses a method according to which a film is formed using a lubricant having a functional group at an end of the molecule and this film is bonded with a protective film by heating or other means, with the superfluous unbonded portion of lubricant being washed away, thereby forming a lubricative film. In this method, however, no regard is given to the structure of the produced lubricative film. It is unsatisfactory in sliding tolerance when the flying height of the head is small, and it also lacks denseness and corrosion resistance.

SUMMARY OF THE INVENTION

In the course of the studies made for solving the above problems, the present inventors have found that it is possible to realize a marked improvement of sliding tolerance and a reduction in adhesiveness of the disc to the head by forming a lubricative film on the disc surface using a lubricant having a functional group at one end of the molecule (lubricant 1) and a lubricant having a functional group at both ends of the molecule (lubricant 2), and have completed the present invention.

The present invention relates to a magnetic recording medium, wherein the improvement comprises a lubricative film comprising two different types of lubricants, one having a functional group at one end of the molecule and the other having a functional group at both ends of the molecule.

An object of this invention, therefore, is to provide a magnetic recording medium having high sliding tolerance and low adhesiveness to the head, and a magnetic storage device using such a magnetic recording medium.

Other objects and advantages of this invention will become apparent from the following detailed description of the invention.

DESCRIPTION OF THE PREFERRED EMBODIMENTS

Figure 1A:
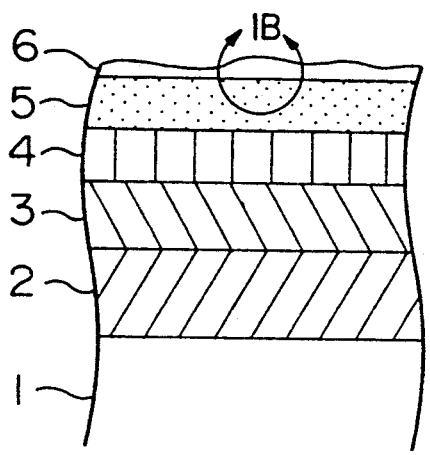
FIG. 1 is a schematic sectional view of a magnetic disc and a partial schematic illustration of a lubricative film on the magnetic disc in an embodiment of the present invention.

In the present invention, a lubricative film is formed which varies in thickness from minute area to area. One method for forming such a film is to use two different types of lubricants, namely a lubricant having a functional group at one end of the molecule (lubricant 1) and a lubricant having a functional group at both ends of the molecule (lubricant 2), as the film components, in an appropriate ratio.

For example, perfluoroether having a molecular weight of around 2,500 is about 10 nm in molecular chain length, so that when using lubricant 1, there can be formed a film having a thickness of about 10 nm, and when using lubricant 2, with both ends being bonded to the surface, there will be formed a film of a thickness which is about half (5 nm) of that of the above-said film. Therefore, if the above both lubricants are used in admixture, there is formed a film having an uneven surface with the maximum peak-to-valley value of about 5 nm. This level of surface roughness is substantially equal to the degree of surface roughness that can be attained by the "texturing" technique according to which the surface is roughened slightly and sufficiently prevented from adhesion to the head. In the present invention, it is possible to dispense with the texturing which involves a troublesome working process.

Since the surface on which a lubricant is applied (usually the surface of a protective film formed on a magnetic film) is unstable in chemical properties, it is preferable that lubricant 1 and lubricant 2 are different in structure of terminal groups for effectuating strong bonding to surfaces having different chemical properties.

Further, as the magnetic disc surface is smooth, the lubricant not bonded to the disc surface is liable to adhere to the head, giving rise to problems on sliding characteristics, such as deterioration of sliding tolerance. For avoiding such a problem, it is expedient to eliminate the non-bonded lubricant as much as possible. Several methods are available for effecting such elimination of non-bonded lubricant. One method comprises immersing the disc in a solvent contained in a tank. In another method, the disc is showered with a solvent.

Another means for making the lubricative film surface uneven at close intervals is to use a lubricant composition having apparently two peaks of molecular weights in case the lubricative film is composed of either lubricant 1 or lubricant 2 alone. For instance, in case of using lubricant 2 alone, it is obvious that the areas with film thickness of 5 nm and 10 nm are formed when a lubricant with molecular weight of 2,500 and the one with molecular weight of 5,000 are used in admixture. It is necessary to confirm experimentally the degree of difference of molecular weight that can produce the desired effect. The experiments conducted by the present inventors ascertained that the object of this invention can be attained by mixing a lubricant with molecular weight of 2,500 and a lubricant with molecular weight of 3,500.

The unevenness of the lubricative film surface thus formed is variable to a considerable degree depending on the orientation of lubricant moelcules in the surface, but normally it can be said that the degree of said unevenness is decided by the molecular weight of lubricant and the number of the functional groups.

In the present invention, a lubricant composition consisting of lubricant 1 and lubricant 2 or a lubricant composition having two peaks of molecular weights is strongly bonded to the disc surface and constitutes a single-layer film varied in thickness. Therefore, when the magnetic disc is brought into contact with the head, first the head is contacted with lubricant 1 or a lubricant having a greater molecular weight on the disc surface, whereby the impact is mitigated to elevate sliding tolerance.

Further, in accordance with the present invention, the lubricants having different terminal groups are mixed and applied on a magnetic disc, so that either of said lubricants is bonded to the protective film and the disc portions not covered with the protective film, such as pinholes. This contributes to making the lubricative film dense and improving sliding tolerance and corrosion resistance.

The present invention will be described in further detail below by showing the examples thereof, which examples, however, are merely intended to be illustrative and not to be construed as limiting the scope of the invention.

EXAMPLE 1

An Ni-P hard primary coating film was formed by plating on an aluminum substrate, and on the primary coating film were formed an intermediate film, a magnetic film and a protective film in that order by sputtering to constitute a magnetic disc.

Then one of the lubricants shown in Table 1 and one of the lubricants shown in Table 2 were mixed. The lubricants shown in Table 1 are all chain-form perfluoroalkyl polyethers having a functional group at both ends of the molecule (lubricant 2), and the lubricants shown in Table 2 are all chain-form perfluoroalkyl polyethers having a functional group at one end of the molecule (lubricant 1). The mixing ratio of the two types of lubricants is not specified, but a composition formed by mixing them at a ratio of 1:1 or thereabout can best improve corrosion resistance.

The molecular weight of lubricant 1 mixed is equal to or greater than that of lubricant 2.

TABLE 1

| No. | Commercial name | Maker | Type | Type of functional group | Peak value of molecular weight |
|---|---|---|---|---|---|
| 1 | FOMBLIN Z DOL | Montefluos | Having functional group at both ends of molecule | Hydroxyl | 2,500 |
| 2 | FOMBLIN Z DISOC | " | Having functional group at both ends of molecule | Isocyanate | 2,500 |
| 3 | FOMBLIN Z DEAL | " | Having functional group at both ends of molecule | Ester | 2,500 |
| 4 | FOMBLIN Z AM2001 | " | Having functional group at both ends of molecule | Aromatic | 2,500 |

TABLE 2

| No. | Commercial name | Maker | Type | Type of functional group | Peak value of molecular weight |
|---|---|---|---|---|---|
| 1 | Demnum SY | Daikin Kogyo KK | Having functional group at one end of molecule | Ester | 3,500 |
| 2 | Demnum NE | Daikin Kogyo KK | Having functional group at one end of molecule | " | 5,000 |
| 3 | Demnum SP | Daikin Kogyo KK | Having functional group at one end of molecule | " | 5,000 |
| 4 | Demnum SH | Daikin Kogyo KK | Having functional group at one end of molecule | Carboxyl | 5,000 |
| 5 | Krytox 157FS | Du Pont | Having functional group at one end of molecule | " | 3,500 |
| 6 | Demnum SY-A | Daikin Kogyo KK | Having functional group at one end of molecule | Ester | 5,000 |

Figure 1B:
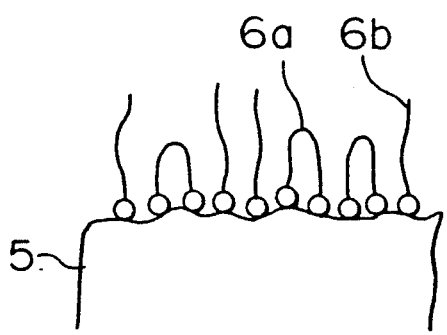

The magnetic disc was immersed in a 0.3% trichlorotrifluoroethane solution of mixed lubricants and then pulled up slowly. If this magnetic disc is put to use as it is, the lubricant portion not bonded to the magnetic disc surface may adhere to the head, giving a large load at the time of re-start of the magnetic storage device to cause operational trouble of the storage or damage to the head and disc. So, the lubricant portion not bonded to the magnetic disc surface was washed away with trichlorotrifluoroethane. The above process gave a single-layer film structure such as shown in FIG. 1. In FIG. 1, reference numeral 1 denotes an aluminum substrate, 2 a hard primary coating film, 3 an intermediate film, 4 a magnetic film, 5 a non-magnetic protective film, 6 a lubricative film, 6a a lubricant having a functional group at both ends of the molecule (lubricant 2), and 6b a lubricant having a functional group at one end of the molecule (lubricant 1).

Figure 2:
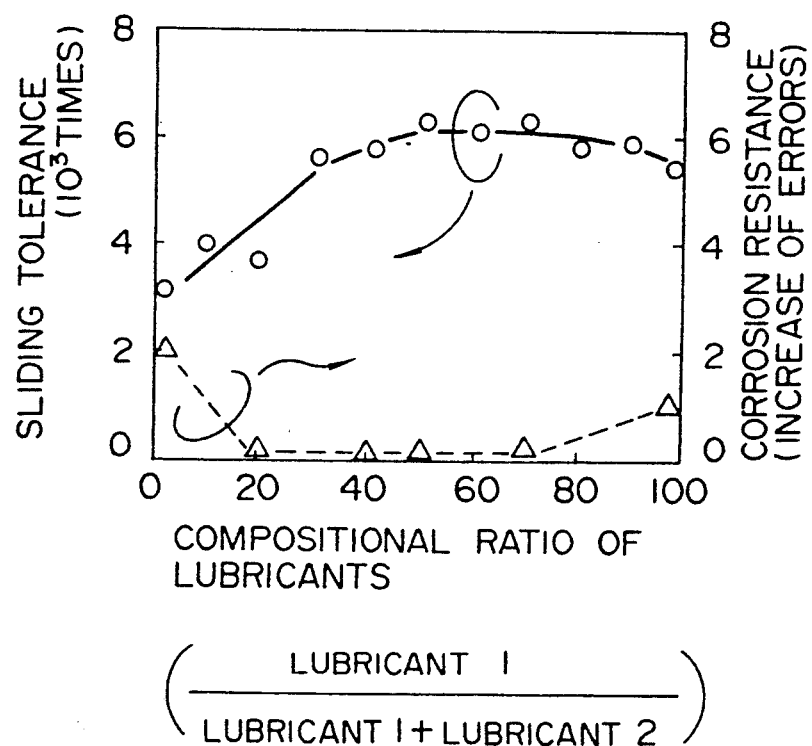
FIG. 2 is a graph showing the relation between sliding tolerance and corrosion resistance with reference to the compositional ratio [lubricant 1/(lubricant 1+lubricant 2)] of the lubricative film of the magnetic disc shown in FIG. 1.
Figure 4:
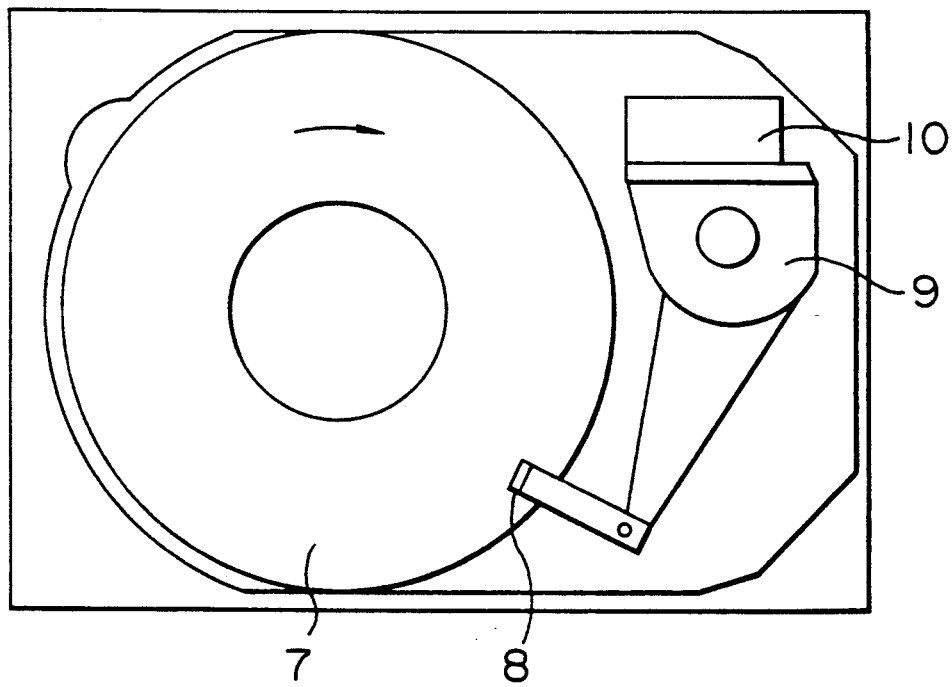
FIG. 4 is a general schematic illustration of a magnetic disc device.

FIG. 2 shows the relation of sliding tolerance to the compositional ratio of lubricants [lubricant 1/ (lubricant 1+lubricant 2)] in a lubricative film formed using lubricant No. 1 in Tabler 2 as lubricant 1 and No. 4 in Table 1 as lubricant 2. A magnetic disc storage device such as shown in FIG. 4 was fabricated for evaluating sliding tolerance. In FIG. 4, reference numeral 7 designates a magnetic disc, 8 a magnetic head which is kept in sliding contact with the magnetic disc 7, 9 an actuator supporting the magnetic head 8, and 10 a voice coil motor which operates the actuator 9.

As the ratio of lubricant 1 was increased, sliding tolerance was improved gradually and assumes a constant level when the ratio reaches around 30%. This phenomenon is supposed attributable to the fact that a lubricative film having fine unevenness is formed by joint use of lubricant 1 and lubricant 2 and the raised portions of such uneven film serve for easing the impact produced by the head on contact with the magnetic disc. It is also observed that when the ratio of lubricant 1 exceeds 70%, unevenness of the lubricative film is lessened, resulting in a reduction of sliding tolerance.

Corrosion resistance of the lubricative film formed according to this invention was also examined. The term "corrosion resistance" used herein refers to the increase of errors after the film has been left in an atmosphere of 60° C. and 80% RH for 72 hours. The result of examination showed that corrosion resistance is also dependent on the compositional ratio of the lubricative film. This is considered due to the fact that by incorporation of the lubricants having different terminal group compositions, a denser lubricative film is formed with a lubricant bonded to the protective film and a lubricant bonded to the portions not covered with the protective film, such as pin-holes. For examining the mechanism of formation of such a lubricative film, an experiment described in the following Example was conducted.

EXAMPLE 2

Figure 3:
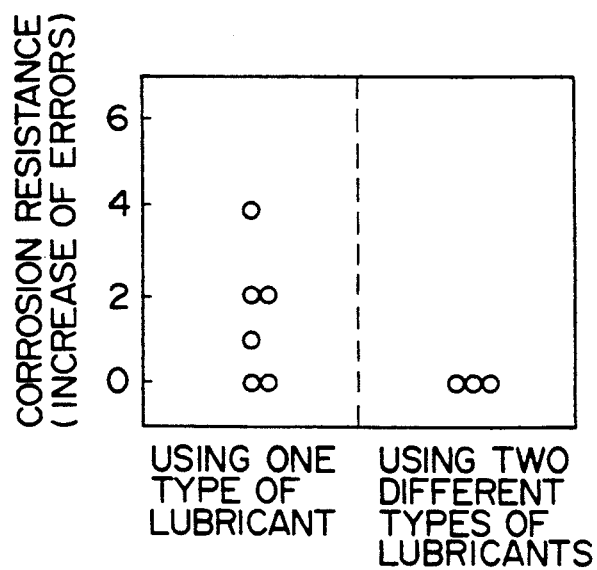
FIG. 3 shows a comparison of corrosion resistance between a disc having a lubricative film compound of one type of lubricant and a disc having a lubricative film composed of two different types of lubricants having a functional group at one and both ends of the molecule.

A magnetic disc fabricated in the same way as in Example 1 was immersed in a 0.3% trichlorotrifluoroethane solution of a lubricant having a functional group at both ends of the molecule (lubricant No. 4 in Table 1) and then pulled up slowly, and the coated disc surface was washed with trichlorotrifluoroethane. The thus treated magnetic disc was again immersed in a 0.3% trichlorotrifluoroethane solution of a lubricant having a functional group different from that mentioned above at one end of the molecule (lubricant No. 1 in Table 2) to effect coating, followed by washing of the coated disc surface with trichlorotrifluoroethane to remove superfluous lubricant. The result of examination of corrosion resistance of the thus obtained magnetic disc is shown in FIG. 3, which evidently shows improvement in corrosion resistance of this magnetic disc in comparison with the disc coated with one type of lubricant. It was also confirmed that this magnetic disc is provided with as high sliding tolerance as the disc produced in Example 1.

EXAMPLE 3

A 0.3% trichlorotrifluoroethane solution of a 1:1 (by weight) mixture of Demnum SY (lubricant No. 1 in Table 2, having a peak value of molecular weight of 3,500) and Demnum SY-A (lubricant No. 6 in Table 2, having a peak value of molecular weight of 5,000) was prepared, and a magnetic disc was treated with this solution in the same way as Example 1. There was noted improvement in corrosion resistance of this magnetic disc.

What is claimed is:

1. A magnetic recording medium having a surface, wherein the improvement comprises a lubricative film being provided at the surface of said medium in the form of a single-layer film varied in thickness and consisting of one member selected from the group consisting of a lubricant (1) having a functional group at one end of the molecule and being bonded to the surface by said functional group and a lubricant (2) having a functional group at both ends of the molecule and being bonded to the surface by said functional group, said lubricative film having two peaks of molecular weights provided by an admixture of lubricant (1) or lubricant (2) having two different molecular weights.

2. A magnetic recording medium according to claim 1, wherein the functional group is selected from the group consisting of hydroxyl, ester, aromatic carboxyl and isocyanate groups.

3. A magnetic storage device having incorporated therein the magnetic recording medium of claim 2.

4. A magnetic storage device having incorporated therein the magnetic recording medium of claim 1.

5. A magnetic recording medium according to claim 1, wherein the compositional ratio of the amount of the lubricant having a functional group at one end of the molecule to the total amount of the lubricant having a functional group at one end of the molecule and a lubricant having a functional group at both ends of the molecule ranges from 20% to 70%.

* * * * *